(12) United States Patent
Gómez Benéitez et al.

(10) Patent No.: US 12,241,511 B2
(45) Date of Patent: Mar. 4, 2025

(54) FILTER FOR A BRAKE DEVICE

(71) Applicant: BRL BRAKE SOLUTIONS, S.L., Valladolid (ES)

(72) Inventors: José María Gómez Benéitez, Simancas (ES); Fernando Gómez de Sebastián, Simancas (ES)

(73) Assignee: BRL BRAKE SOLUTIONS, S.L., Valladolid (ES)

( * ) Notice: Subject to any disclaimer, the term of this patent is extended or adjusted under 35 U.S.C. 154(b) by 368 days.

(21) Appl. No.: 17/784,292

(22) PCT Filed: Dec. 1, 2020

(86) PCT No.: PCT/ES2020/070753
§ 371 (c)(1),
(2) Date: Jun. 10, 2022

(87) PCT Pub. No.: WO2021/116512
PCT Pub. Date: Jun. 17, 2021

(65) Prior Publication Data
US 2022/0381306 A1    Dec. 1, 2022

(30) Foreign Application Priority Data
Dec. 11, 2019   (ES) ................................ 201932015U

(51) Int. Cl.
*F16D 65/00*    (2006.01)
*B01D 46/00*    (2022.01)
*B01D 46/24*    (2006.01)

(52) U.S. Cl.
CPC ..... *F16D 65/0031* (2013.01); *B01D 46/0005* (2013.01); *B01D 46/24* (2013.01); *B01D 2265/02* (2013.01); *B01D 2279/40* (2013.01)

(58) Field of Classification Search
CPC .... F16D 65/0031; F16D 65/84; F16D 65/853; B01D 46/0005; B01D 46/24;
(Continued)

(56) References Cited

U.S. PATENT DOCUMENTS

| | | | |
|---|---|---|---|
| 5,772,286 A | * | 6/1998 | Jordan ................ F16D 65/0031 |
| | | | 301/37.104 |
| 2010/0096226 A1 | * | 4/2010 | Gelb ..................... F16D 65/847 |
| | | | 188/264 AA |

(Continued)

FOREIGN PATENT DOCUMENTS

| | | |
|---|---|---|
| DE | 102016108793 A1 | 11/2017 |
| DE | 102016117778 A1 | 3/2018 |

(Continued)

*Primary Examiner* — Hung Q Nguyen
(74) *Attorney, Agent, or Firm* — The Webb Law Firm

(57) ABSTRACT

The present disclosure relates to a filter for a brake device, comprising a case, a cylindrical tubular filtering element and a dismantlable axial fastening system. The filtering element is located inside the case and the case includes a cylindrical tubular lateral wall having two opposite end edges, a first and a second. The filtering element sits on an internal surface of the lateral wall of the case. The dismantlable axial fastening system provides axial fastening of the filter when same is assembled in the brake device, axial fastening of the filtering element inside the case, and means for assembling and dismantling the filter. The purpose of the filter is to collect all the particles harmful to health that are released each time the brake device brakes, preventing said particles from being transferred to the air that is breathed.

17 Claims, 5 Drawing Sheets

(58) Field of Classification Search
CPC ............ B01D 2265/02; B01D 2279/40; B01D 46/103; B01D 46/02
See application file for complete search history.

(56) References Cited

U.S. PATENT DOCUMENTS

| | | | |
|---|---|---|---|
| 2014/0054119 A1* | 2/2014 | Hummel | F16D 65/0031 188/218 A |
| 2018/0031059 A1* | 2/2018 | Gelb | F16D 65/0031 |
| 2019/0128350 A1* | 5/2019 | Goodell | F16D 65/10 |
| 2020/0217381 A1 | 7/2020 | Gómez Benéitez et al. | |

FOREIGN PATENT DOCUMENTS

| | | | | |
|---|---|---|---|---|
| DE | 102017008423 A1 * | 3/2019 | | B60T 1/06 |
| EP | 0210363 A1 | 2/1987 | | |
| EP | 2663784 B1 | 2/2017 | | |
| ES | 2705358 A1 | 3/2019 | | |
| JP | S63129729 U | 8/1988 | | |
| JP | 2008196684 A | 8/2008 | | |
| KR | 200192114 Y1 | 8/2000 | | |
| WO | WO-8201574 A * | 5/1982 | | F16D 55/00 |
| WO | 2012095273 A1 | 7/2012 | | |
| WO | 2019058009 A1 | 3/2019 | | |

* cited by examiner

FILTER FOR A BRAKE DEVICE

CROSS-REFERENCE TO RELATED APPLICATIONS

This application is the United States national phase of International Application No. PCT/ES2020/070753 filed Dec. 1, 2020, and claims priority to Spanish Utility Model Application No. U201932015 filed Dec. 11, 2019, the disclosures of which are hereby incorporated by reference in their entirety.

BACKGROUND OF THE INVENTION

Field of the Invention

The present disclosure relates to a filter for a brake device the purpose of which is to collect all the particles harmful to health that are released each time the brake devices brakes, preventing said particles from being transferred to the air that is breathed, such that every certain number of kilometres of the vehicle incorporating the filter of the present disclosure, a filtering element which is the element in charge of retaining harmful particles can be easily changed. It is even possible for the filtering element to be washable. It should be noted that once the filter of the present disclosure is assembled, the brake device is encapsulated within an inner space of the filter.

DESCRIPTION OF RELATED ART

The serious pollution problem generated by brake particles that are released into the air, especially in large cities, as much or more than engine combustion, releasing particles smaller than 10 microns into the air, which penetrate the human body causing serious health consequences, is well known today.

On the other hand, drastic measures are being taken to protect the environment with regard to the combustion of gases from combustion engines, but, conversely, very little or nothing is said about the pollution generated by brakes, when these can release more than 10,000 tonnes of brake lining particles into the air in a large city, where these polluting particles are then inhaled by people.

Obviously, practically nobody talks about this problem of pollution generated by brakes because until now there was no solution to said problem, although major vehicle brands are starting to become aware of the problem.

The explanation as to why there is no solution is simple: a brake disc cannot be fully encapsulated because it needs to be air-cooled.

Furthermore, the serious problem that is also generated in brakes when there is an excess of temperature in a brake disc is known to all. Therefore, a disc brake cannot be encapsulated because it is incompatible with its need to be air-cooled.

Concern in this regard is taking centre stage in all major car brands and they are designing different systems, with the limitation that they are not capable of filtering all the harmful particles released from the brakes, obtaining very poor results.

In the brake device of patent ES2705358 the cooling of the brake disc is liquid by recirculation through a coolant radiator through tubes, the cooling capacity of the brake disc being such that said brake disc, subjected to a certification test (Grosslockner), consisting of sustained braking for about 40 minutes, does not exceed a temperature of 53° C., where a conventional brake disc exceeds 500° C.

SUMMARY OF THE INVENTION

For the purpose of achieving the objectives and avoiding the drawbacks mentioned in the above sections, the present disclosure proposes a filter for a brake device comprising a case, a cylindrical tubular filtering element and a dismantlable axial fastening system.

The filtering element is located and fitted inside the case, wherein the case includes at least one cylindrical tubular lateral wall having two opposite end edges, a first and a second. The filtering element sits on an internal surface of the lateral wall of the case.

The dismantlable axial fastening system provides axial fastening of the filter when same is assembled in the brake device, axial fastening of the filtering element inside the case, and the means needed for being able to assemble and dismantle the filter.

In a first embodiment of the present disclosure, the cylindrical tubular case is a whole body and includes an annular bottom which is integrally attached to the first end edge of the lateral wall forming part of the case itself, whereas a support ring is coupled in a dismantlable manner at the second end edge of the case, wherein the annular bottom and the support ring constitute the dismantlable axial fastening system.

The support ring includes an annular groove in which the second end edge of the case fits, wherein the support ring is anchored in a dismantlable manner to the case by means of engagement mechanisms.

Each of the engagement mechanisms comprises a pivoting blade, an articulated frame connected in an articulated manner to the pivoting blade, and a fixed flange on which the articulated frame engages in an anchoring position of the engagement mechanism, wherein each pivoting blade is coupled in an articulated manner to a protruding appendage integral with the support ring, whereas the fixed flange is integral with the case.

Both the annular bottom and the support ring include through holes aligned with the axial channels of the filtering element.

In a second embodiment of the present disclosure, the case comprises two parts which are attached by means of a hinged articulation, while at the same time including engagement mechanisms (equivalent to those described in the first embodiment) which are configured for engaging between one another the two parts of said case and thus stably put together the structure of the case with the cylindrical tubular configuration, wherein said engagement mechanisms are located in proximity to facing edges of the two parts of the case The filter of the second embodiment comprises two opposing support rings constituting the dismantlable axial fastening system of the filter when same is assembled in the brake device, wherein the support rings are placed in parallel planes inside the case in contact with the internal surface of the case, wherein said contact is close to the two opposite end edges, a first and a second of the case.

The support rings of the second embodiment include through holes which are aligned with the axial channels of the filtering element.

The support ring coupled to the case of the first embodiment and one of the support rings coupled to the case of the second embodiment of the present disclosure include pairs of boreholes which are configured for sleeves to be fitted therein.

The lateral walls of the cases include holes in their entirety.

Next, to help better understand this specification and as an integral part thereof, a series of figures is attached in which the object of the present disclosure is depicted in an illustrative and non-limiting manner.

DETAILED DESCRIPTION OF THE INVENTION

Figure 1:
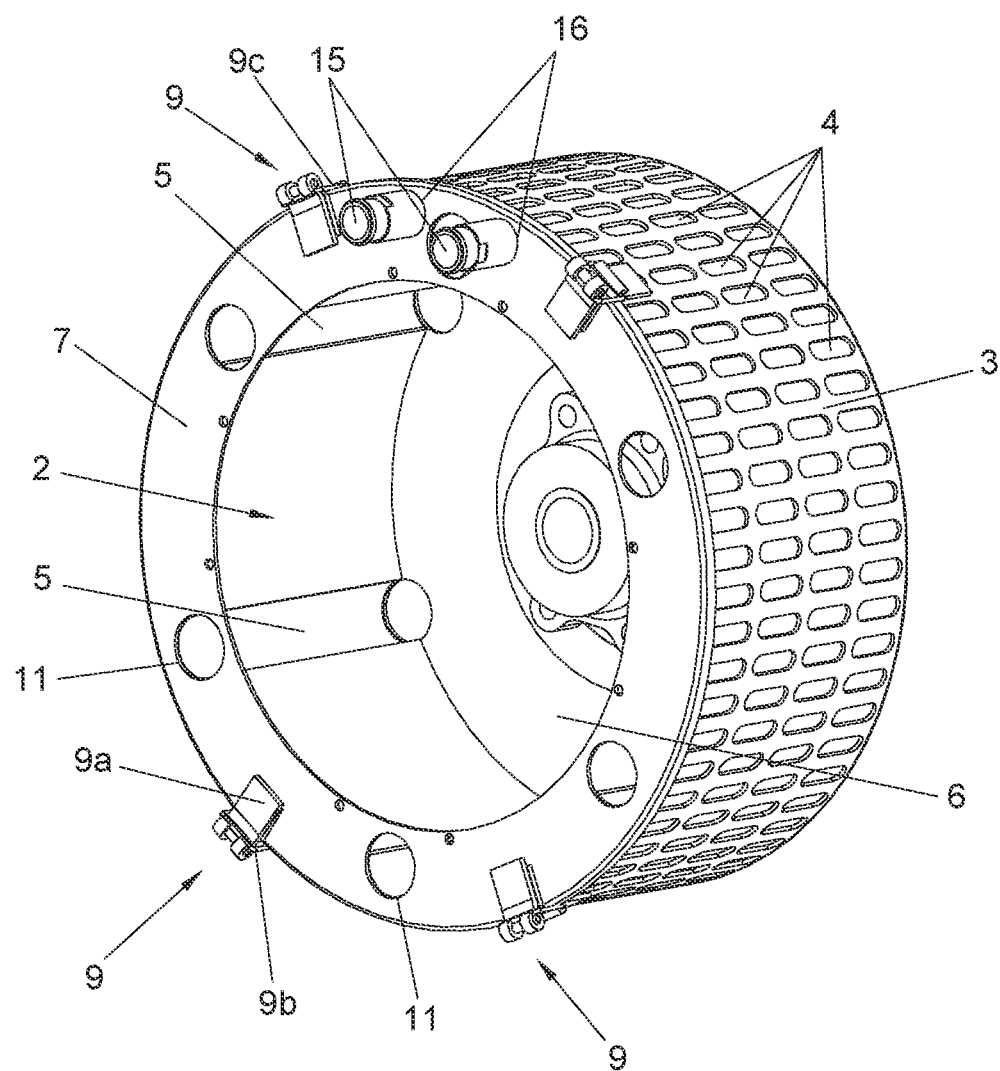
FIG. 1 shows a perspective view of the filter for a brake device, object of the present disclosure, according to a first embodiment.

Considering the numbering adopted in the figures, the filter for a brake device F comprises a case 1, 1' made of sheet metal, a cylindrical tubular filtering element 2 and a dismantlable axial fastening system which allows the filter assembly of the present disclosure to first be assembled in the brake device F and dismantled; second it provides axial fastening of the filter when same is assembled on the filter device; and third it provides axial fastening of the filtering element 2.

The filtering element 2 is located and fitted inside the case 1, 1', wherein the case 1, 1' includes at least one cylindrical tubular lateral wall 3 having two opposite end edges, a first and a second. The filtering element 2 sits on an internal surface of the lateral wall 3 of the case 1, 1'. Said lateral wall 3 of the case 1, 1' includes a set of holes 4.

Once the filter of the present disclosure is assembled around the brake device F, the latter is encapsulated within an inner space of the filter, wherein said inner space is radially delimited by the filtering element 2 having a cylindrical tubular configuration. The filtering element 2 is configured for retaining contaminating particles that are released from the brake device F housed inside the inner space delimited by the filtering element 2, such as for example the brake device described in present disclosure patent ES2705358, wherein said brake device externally includes protrusions fitting into axial channels 5 located in the filtering element 2.

Figure 2:
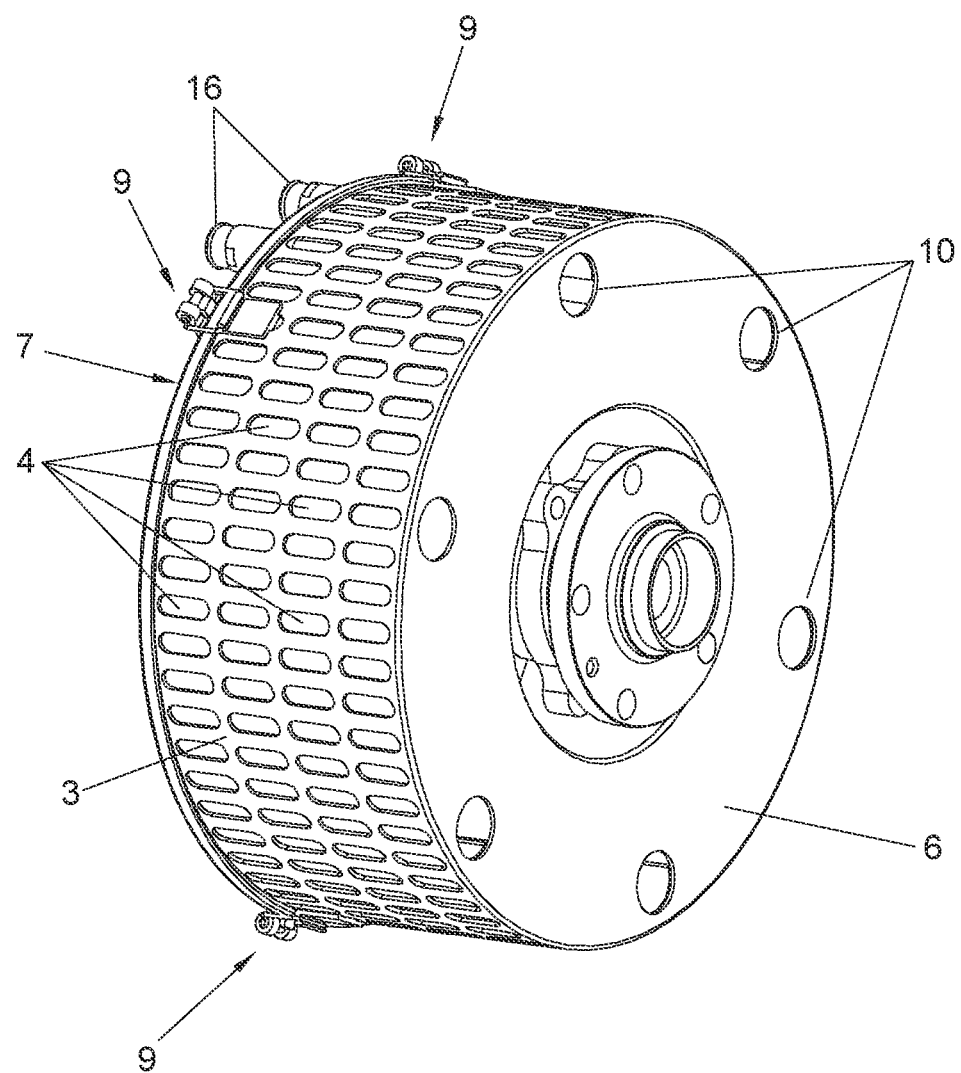
FIG. 2 depicts another perspective view of the filter of the present disclosure shown in FIG. 1.
Figure 3:
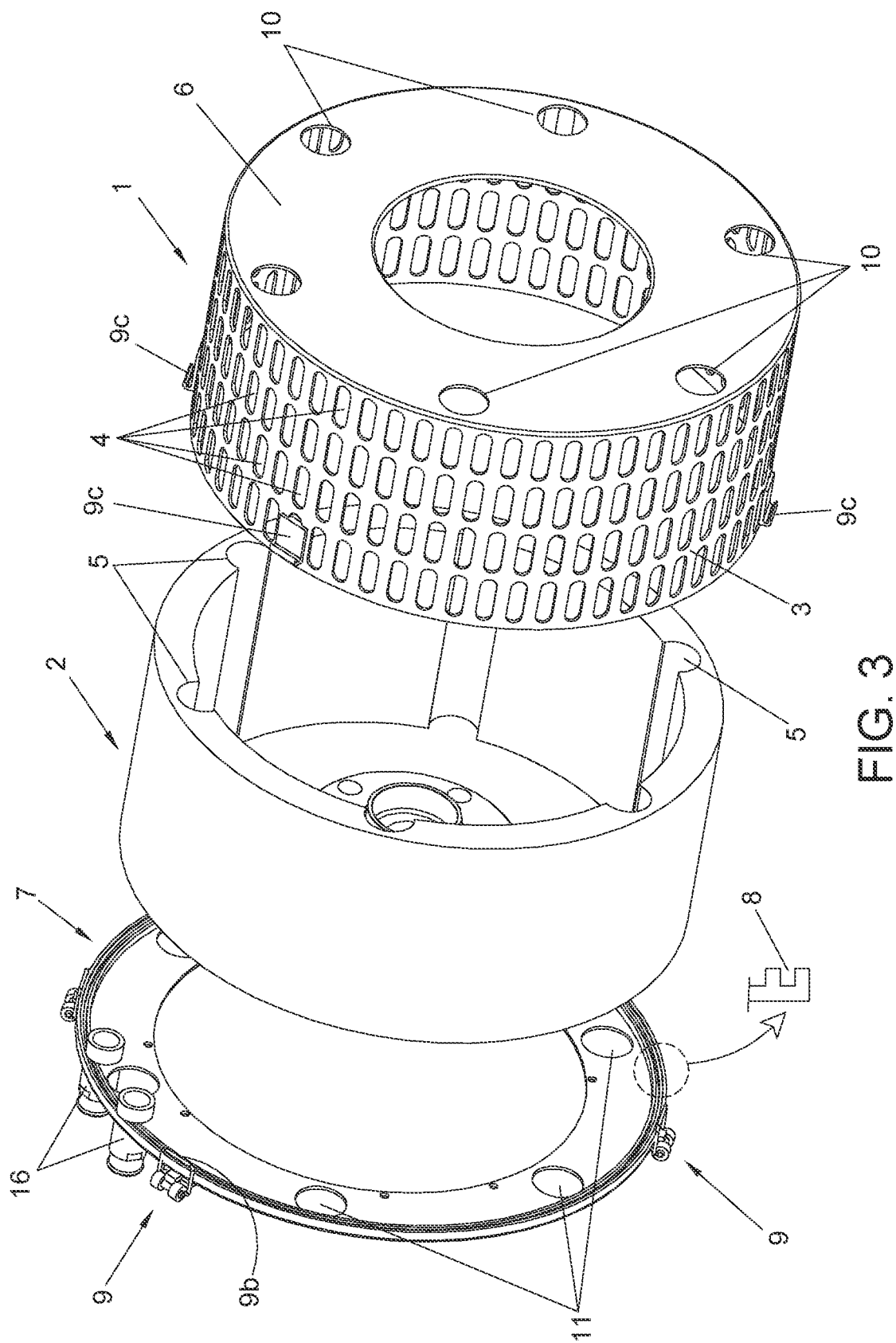
FIG. 3 shows an exploded perspective view of the filter for a brake device depicted in the preceding figures.

In a first embodiment of the present disclosure shown in FIGS. 1 to 3, the cylindrical tubular case 1 is a whole body and includes an annular bottom 6 in the form of a washer which is integrally attached to the first end edge of the lateral wall 3 forming part of the case 1 itself, whereas a support ring 7 is coupled in a dismantlable manner to the second end edge of the case 1.

To that end, the support ring 7 includes an annular groove 8 in which the second end edge of the case 1 fits. Furthermore, to secure the fastening of the support ring 7 on the case 1, engagement mechanisms 9 are included, each of which comprises a pivoting blade 9a, an articulated frame 9b connected in an articulated manner to the pivoting blade 9a, and a fixed flange 9c on which the articulated frame 9b engages in an anchoring position of the engagement mechanism 9.

Each pivoting blade 9a is coupled in an articulated manner to a protruding appendage integral with the support ring 7, whereas the fixed flange is integral with the case 1.

In this first embodiment of the present disclosure being described, the dismantlable axial fastening system of the filter assembly is formed by the annular bottom 6 of the case 1 and by the support ring 7, wherein both the annular bottom 6 and the support ring 7 include through holes 10, 11 aligned with the axial channels 5 of the filtering element 2.

Figure 4:
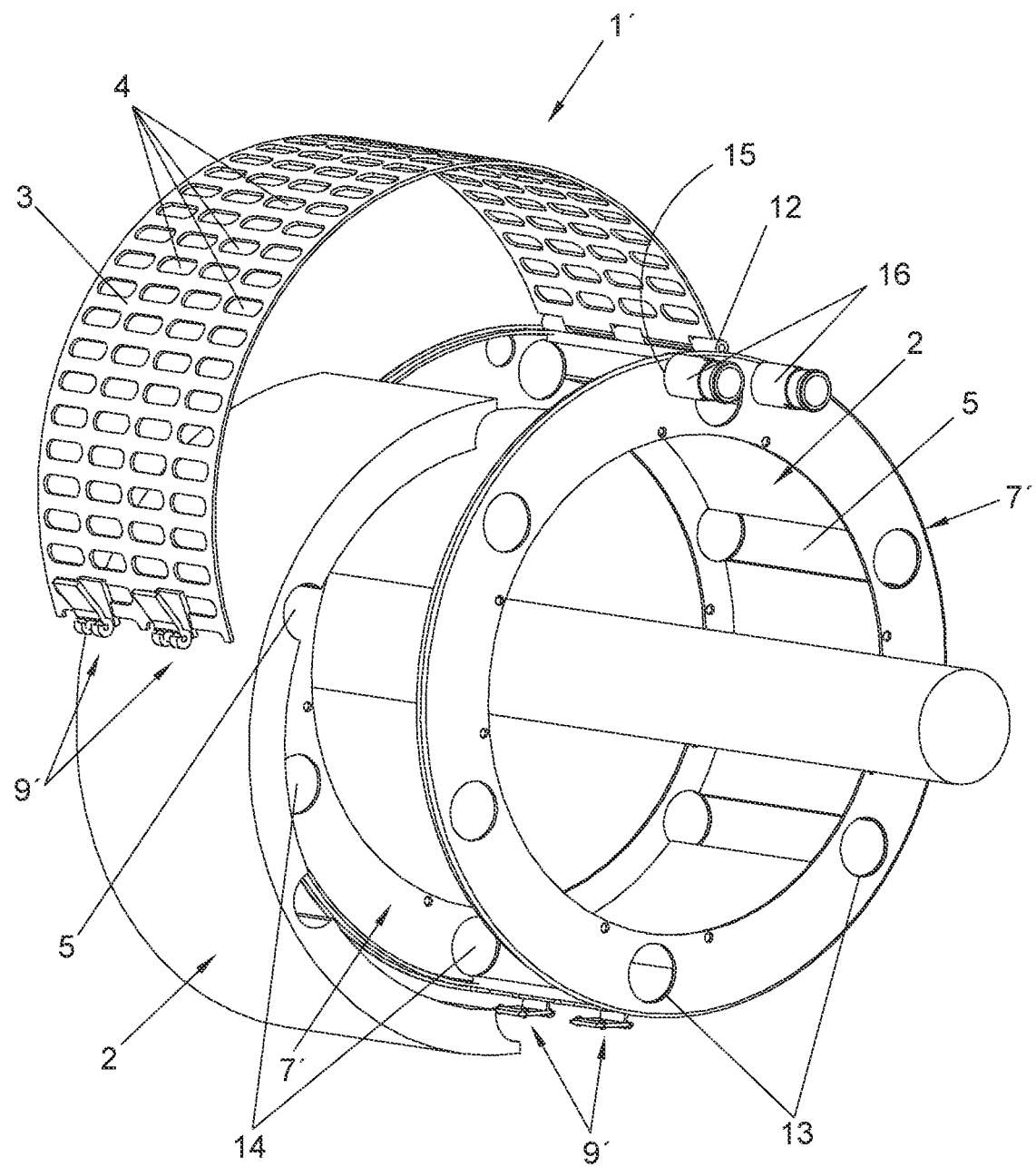
FIG. 4 depicts another exploded perspective view of the filter for a brake device of the present disclosure according to a second embodiment different from the embodiment shown in the preceding figures.
Figure 5:
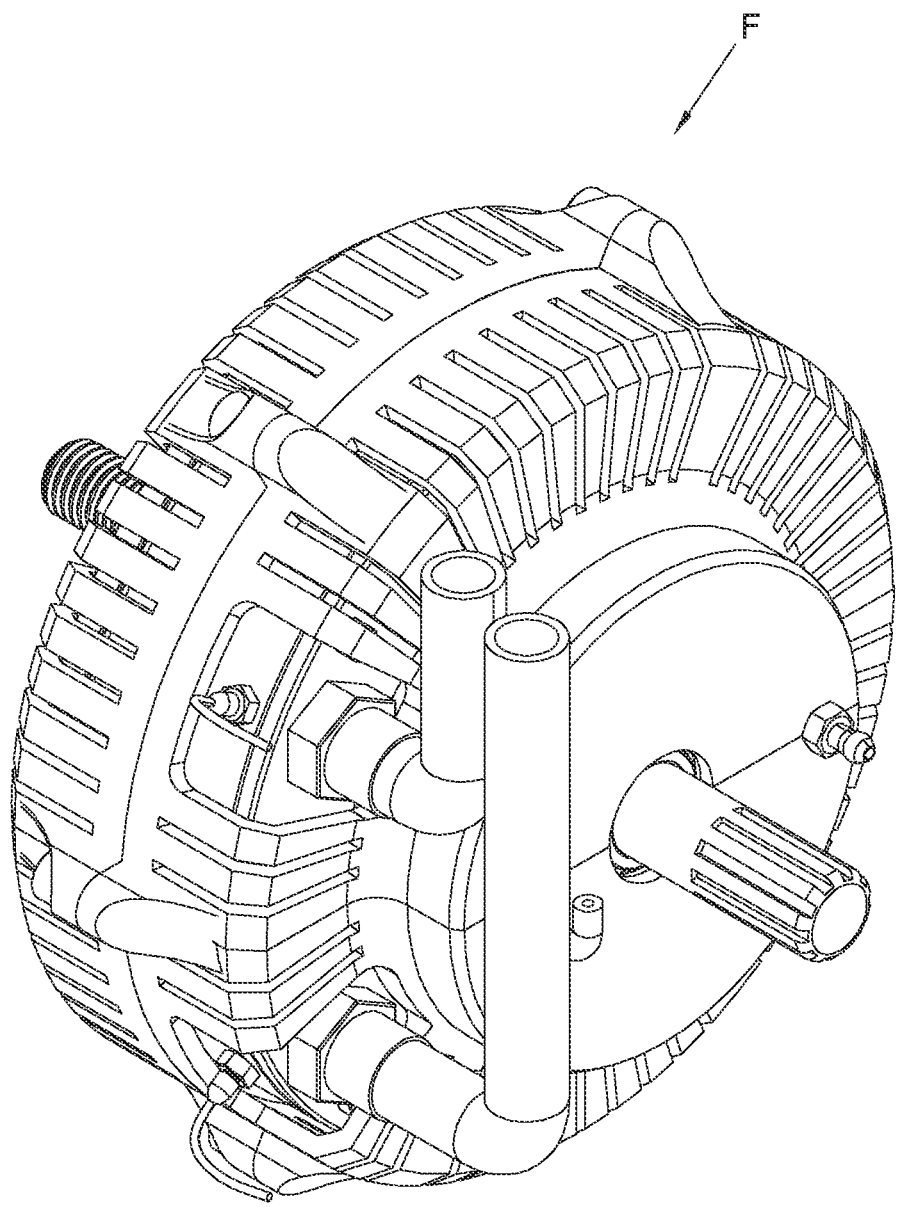
FIG. 5 shows a perspective view of a brake device.

In a second embodiment of the present disclosure shown in FIG. 4, the case 1' comprises two parts which are attached by means of a hinged articulation 12, while at the same time including engagement mechanisms 9' such as those described above for being able to engage between one another the two parts of said case 1' and being able to stably put together the structure of the cylindrical tubular case 1'. Said engagement mechanisms 9' are located in proximity to facing edges of the two parts of the case 1'.

In this second embodiment of the present disclosure, the filtering element 2 comprises two separate parts that are joined together when the filter is assembled around the brake device F, wherein in said assembled position the filtering element 2 forms a cylindrical tubular shape equivalent to that described in the first embodiment.

In the second embodiment of the present disclosure, there are furthermore included two opposing support rings 7' constituting the dismantlable axial fastening system of the filter when same is assembled in the brake device F. To that end, the support rings 7' are placed in parallel planes inside the case 1' in contact with the internal surface of the case 1', wherein said contact is close to the two opposite end edges: first and second of the case 1'. The support rings 7' include through holes 13, 14 aligned with the axial channels 5 of the filtering element 2.

Moreover, both the support ring 7 of the first embodiment and one of the support rings 7' of the second embodiment of the present disclosure include pairs of boreholes 15 which are configured for sleeves 16 to be fitted therein for connecting to cooling conduits of the brake device described in patent ES2705358, which belongs to the same proprietor as the present disclosure.

Therefore, the assembly of the case 1, 1' made of drilled sheet metal together with the filtering element (2) surrounds the brake device F, such that all the particles that are released in each braking are deposited in said filtering element 2, preventing them from being released into the air.

When the filter has been used for a certain number of kilometres, a first option includes the filtering element 2 being replaced with another new one and being able to recycle the used filtering element 2; and a second option includes being able to use the filtering element again if it is washable. In this situation, the brake device of the mentioned patent is once again in conditions where it can continue braking and protecting the environment.

The protection of the present disclosure also extends to "soundproofing" with respect to the noise generated by the brake device in each braking, and to the "protection of the brake device against external agents", such as dust, sand, small stones, etc.

In the design of the encapsulation of the brake device of the referenced patent, the easy replacement of the filter has been taken into account, where once the wheel of a vehicle has been removed, it leaves the encapsulation of the case 1, 1' in view, in such a way that by actuating the engagement mechanisms 9, 9' by hand, the case 1, 1' is released and can be manually removed outwards, leaving the particle filtering element 2 in view, which in turn, by extracting it also outwards, allows its easy replacement, proceeding by the same method for its assembly.

The figures show descriptive but non-limiting examples of the encapsulation system mainly applicable to the brake device of the referenced patent ES2705358, and its design variants for the easy replacement of the particle filtering element 2, also depending on the positioning arrangement of said brake device; it should also be noted that the filtering of harmful particles is 100%.

It is important to understand that the brake device of the referenced patent has the technical capability to be installed both on the wheel (non-suspended) and on the vehicle chassis (suspended). The first embodiment of the present disclosure would be appropriate for being installed on the wheel of a vehicle, whereas the second embodiment of the present disclosure could be installed both ways.

It is important to understand that the brake device of the referenced patent ES2705358 has the technical capability to be installed both on the wheel (non-suspended) and on the vehicle chassis (suspended), such that the first embodiment of the filter of the present disclosure would be appropriate for being installed on the wheel of a vehicle, whereas the second embodiment of the present disclosure would be appropriate for being installed both ways.

The invention claimed is:

1. A filter for a brake device, comprising:
   a case including at least one cylindrical tubular lateral wall having a first end edge and a second end edge opposite the first end edge,
   a cylindrical tubular filtering element located and fitted inside the case and sitting on an internal surface of the lateral wall of the case, and
   a dismantlable axial fastening system;
   wherein the dismantlable axial fastening system provides axial fastening of the filter when assembled in the brake device, axial fastening of the cylindrical tubular filtering element inside the case, and means for assembling and dismantling the filter.

2. The filter for a brake device according to claim 1, wherein the case is a whole body and includes an annular bottom which is integrally attached to the first end edge of the lateral wall forming part of the case itself, whereas a support ring is coupled in a dismantlable manner at the second end edge of the case, wherein the annular bottom and the support ring constitute the dismantlable axial fastening system.

3. The filter for a brake device according to claim 2, wherein the support ring includes an annular groove in which the second end edge of the case fits, wherein the support ring is anchored in a dismantlable manner to the case by means of engagement mechanisms.

4. The filter for a brake device according to claim 3, wherein each of the engagement mechanisms comprises a pivoting blade, an articulated frame connected in an articulated manner to the pivoting blade, and a fixed flange on which the articulated frame engages in an anchoring position of the engagement mechanism, wherein each pivoting blade is coupled in an articulated manner to a protruding appendage integral with the support ring, whereas the fixed flange is integral with the case.

5. The filter for a brake device according to claim 2, wherein the annular bottom and the support ring include through holes aligned with axial channels of the filtering element.

6. The filter for a brake device according to claim 1, wherein the case comprises two parts which are attached by means of a hinged articulation, while at the same time including engagement mechanisms which are configured for engaging between one another the two parts of said case and thus configure the structure of the case with the cylindrical tubular filtering element, wherein said engagement mechanisms are located in proximity to facing edges of the two parts of the case.

7. The filter for a brake device according to claim 6, further comprising two opposing support rings constituting the dismantlable axial fastening system of the filter when assembled in the brake device, wherein the support rings are placed in parallel planes inside the case in contact with the internal surface of the case, wherein said contact is close to the first end edge and the second end edge of the case.

8. The filter for a brake device according to claim 7, wherein the support rings include through holes which are aligned with axial channels of the cylindrical tubular filtering element.

9. The filter for a brake device according to claim 2, wherein a support ring coupled to the case includes pairs of boreholes which are configured for sleeves to be fitted therein.

10. The filter for a brake device according to claim 1, wherein the lateral wall of the case includes a set of holes.

11. The filter for a brake device according to claim 3, wherein the annular bottom and the support ring include through holes aligned with axial channels of the filtering element.

12. The filter for a brake device according to claim 4, wherein the annular bottom and the support ring include through holes aligned with axial channels of the filtering element.

13. The filter for a brake device according to claim 3, wherein a support ring coupled to the case includes pairs of boreholes which are configured for sleeves to be fitted therein.

14. The filter for a brake device according to claim 4, wherein a support ring coupled to the case includes pairs of boreholes which are configured for sleeves to be fitted therein.

15. The filter for a brake device according to claim 5, wherein a support ring coupled to the case includes pairs of boreholes which are configured for sleeves to be fitted therein.

16. The filter for a brake device according to claim 6, wherein a support ring coupled to the case includes pairs of boreholes which are configured for sleeves to be fitted therein.

17. The filter for a brake device according to claim 7, wherein a support ring coupled to the case includes pairs of boreholes which are configured for sleeves to be fitted therein.

* * * * *